(12) United States Patent
Feng et al.

(10) Patent No.: US 7,398,336 B2
(45) Date of Patent: Jul. 8, 2008

(54) SWITCHING DEVICE FOR RS-232 SERIAL PORT AND USB SERIAL PORT

(75) Inventors: Ya-Tsung Feng, Kaohsiung (TW); Ming-Hung Chueh, Kaohsiung (TW); Yu-Shan Liu, Kaohsiung (TW); Yao-Jen Chang, Kaohsiung (TW)

(73) Assignee: UIS Abler Electronics Co., Ltd., Hsintien, Taipei Hsien (TW)

( * ) Notice: Subject to any disclaimer, the term of this patent is extended or adjusted under 35 U.S.C. 154(b) by 382 days.

(21) Appl. No.: 11/016,744

(22) Filed: Dec. 21, 2004

(65) Prior Publication Data
US 2005/0154799 A1 Jul. 14, 2005

(30) Foreign Application Priority Data
Jan. 8, 2004 (TW) .............................. 93200297 U (51) Int. Cl.
*G06F 3/00* (2006.01)
(52) U.S. Cl. .............................. 710/36; 710/31; 710/62; 710/72; 710/107; 307/112; 307/139
(58) Field of Classification Search ........................ None
See application file for complete search history.

(56) References Cited

U.S. PATENT DOCUMENTS

| | | | |
|---|---|---|---|
| 4,058,735 A * | 11/1977 | Tippner | 250/551 |
| 4,528,459 A * | 7/1985 | Wiegel | 307/66 |
| 5,961,611 A * | 10/1999 | Oh | 710/1 |
| 6,355,936 B1 * | 3/2002 | Mastio | 250/551 |
| 6,601,124 B1 * | 7/2003 | Blair | 710/305 |
| 2003/0118055 A1 * | 6/2003 | Fecher et al. | 370/493 |
| 2004/0133722 A1 * | 7/2004 | Croyle et al. | 710/105 |

FOREIGN PATENT DOCUMENTS

JP 2002215276 A * 7/2002

* cited by examiner

*Primary Examiner*—Henry Tsai
*Assistant Examiner*—Henry Yu
(74) *Attorney, Agent, or Firm*—Bacon & Thomas, PLLC (57) ABSTRACT

A switching device for RS-232 serial port and USB serial port is adapted to simultaneously provide a RS-232 serial port and a USB serial port for a micro-processor with a single USART. The switching device can automatically switch to select either of the RS-232 serial port or the USB serial port as a main interface for communicating with other external computer facilities and related peripheries. When one of the serial ports is selected as the main communication interface to communicate with one of external computers, the other one serial port thereof still can transmit signals from the micro-processor to another computer through its transmitting data pin (TXD).

9 Claims, 7 Drawing Sheets

SWITCHING DEVICE FOR RS-232 SERIAL PORT AND USB SERIAL PORT

BACKGROUND OF THE INVENTION

1. Field of the Invention

The present invention relates to a switching device for selecting RS-232 serial port and USB serial port. More particularly, the present invention relates to using a photo-coupler to automatically select one receiving data pin (RXD line) of both RS-232 serial port and USB serial port so that a computer and peripherals thereof are able to communicate with the RS-232 serial port or the USB serial port. In operation, when one of the RS-232 serial port and the USB serial port is selected, a transmitting data pin (TXD line) of the other is still able to transmit data from a microprocessor to another computer.

2. Description of the Related Art

Conventionally, a computer usually possesses a single RS-232 (Recommended standard 232) communication port or USB (Universal Serial Bus) communication port and hardly possesses these two ports at the same time. This results in inconvenience in data communication.

Figure 1:
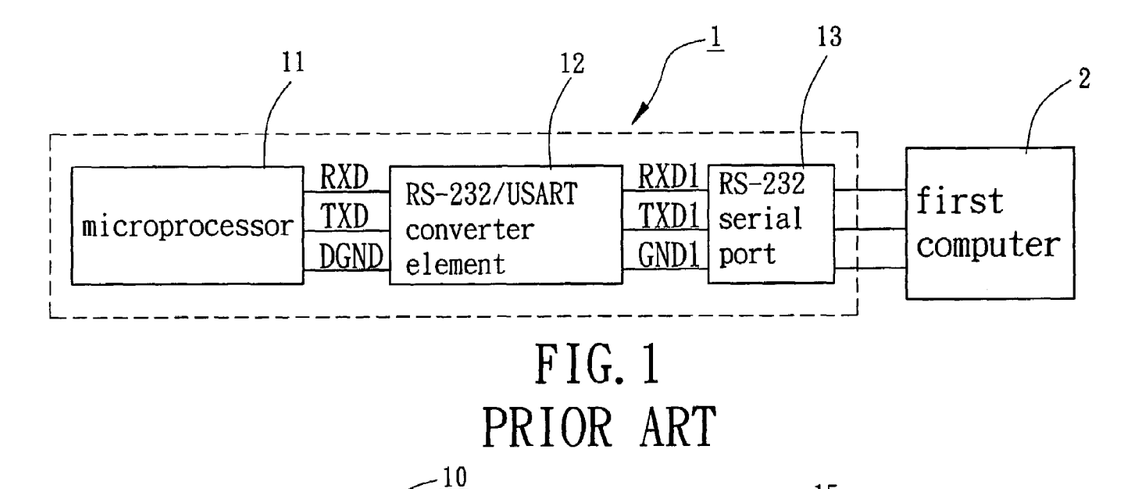
FIG. 1 is a schematic view of a conventional communication device having a RS-232 serial port in accordance with the prior art.

The conventional communication device using the RS-232 communication port, as shown in FIG. 1, includes a single USART (Universal Synchronous Asynchronous Receiver Transmitter) microprocessor 11, a RS-232/USART converter element 12 and a RS-232 serial port 13. The communication device 1 adopts serial communication and has a signal transmission line for transmitting and receiving data. The microprocessor 11 contains a single USART set electrically connecting to the RS-232/USART converter element 12 for converting voltage signals. Further, the RS-232/USART converter element 12 electrically connects to the RS-232 serial port 13 that communicates with a first computer 2 via a transmission line. The first computer 2 is able to transmit and receive data bit by bit through a transmission line.

In 1969 the Electrical Industries Association adopted the RS-232 communication protocol which has two voltage signal ranges: one ranging between −3V and −25V denoting logical signal "1" and the other ranging between 3V and 25V denoting logical signal "0". A computer peripheral, such as UPS, contains a microprocessor control unit (MCU) using a voltage 5V or 3.3V. Therefore, the conventional communication device 1 must include the RS-232/USART converter element 12 for converting transmission signals of the microprocessor 11 and the RS-232 serial port 13.

Figure 2:
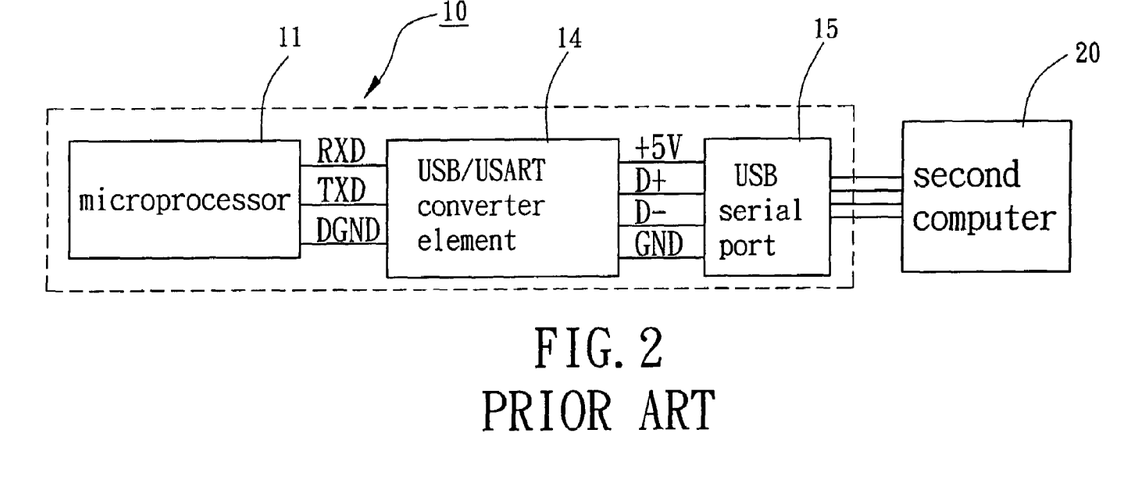
FIG. 2 is a schematic view of another conventional communication device having a USB serial port in accordance with the prior art.

Referring to FIG. 2, the other conventional communication device 10 includes a single USART microprocessor 11, a USB/USART converter element 14 and a USB serial port 15. The microprocessor 11 contains a single USART set electrically connecting to the USB/USART converter element 14 for converting voltage signals. Further, the USB/USART converter element 14 electrically connects to the USB serial port 15 that communicates with a second computer 20 via a transmission line. The second computer 20 is able to transmit and receive data bit by bit through a transmission line.

The USB communication protocol was developed by Intel, Compaq, DEC, IBM, Microsoft, NEC, and Northern Telecom. However, USB protocol has replaced RS-232 protocol and become a single, general-purpose port for computer peripherals. It is apparent that the USB serial port is a universal protocol port for computer peripherals communicating with a host computer.

Recently, communication interfaces of both RS-232 and USB are widely applied to a computer system and peripherals. The peripheries of the computer must offer these two interfaces at the same time. So far, the RS-232 serial port of a computer peripheral is only available for an RS-232 protocol interface of the computer system. To exchange the RS-232 protocol interface of the computer system with a USB interface, it is necessary to add an RS-232/USB converter. Alternatively, the USB serial port of a computer peripheral is only available for a USB interface of the computer system. To exchange the USB interface of the computer system with an RS-232 protocol interface, it is necessary to add a USB/RS-232 converter. From the viewpoint of manufacture, it is inconvenient for production management to produce the different peripheries with only one of communication interfaces for RS-232 and USB.

Figure 3:
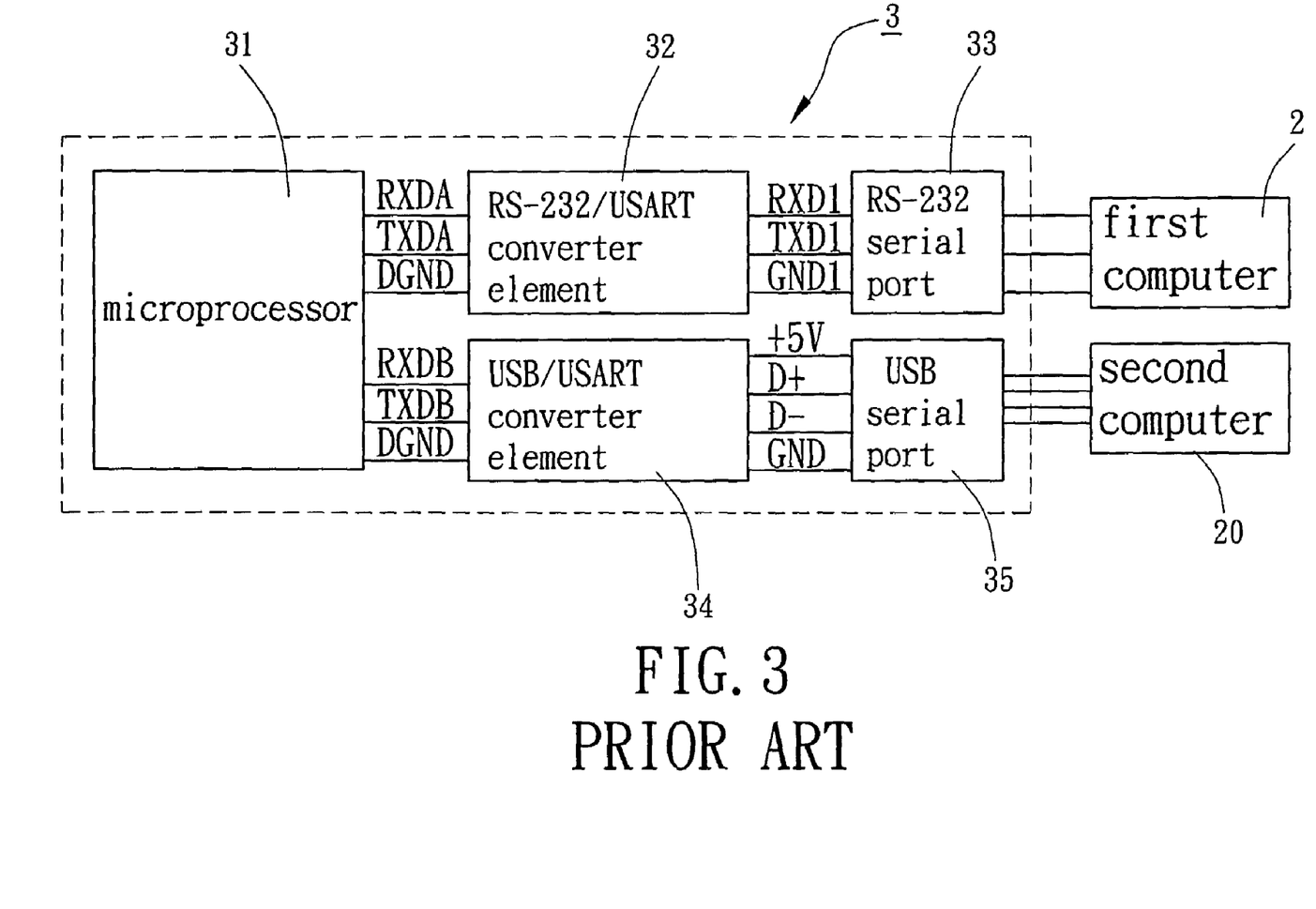
FIG. 3 is a schematic view of a conventional communication device having both of a RS-232 serial port and a USB serial port in accordance with the prior art.
Figure 4:
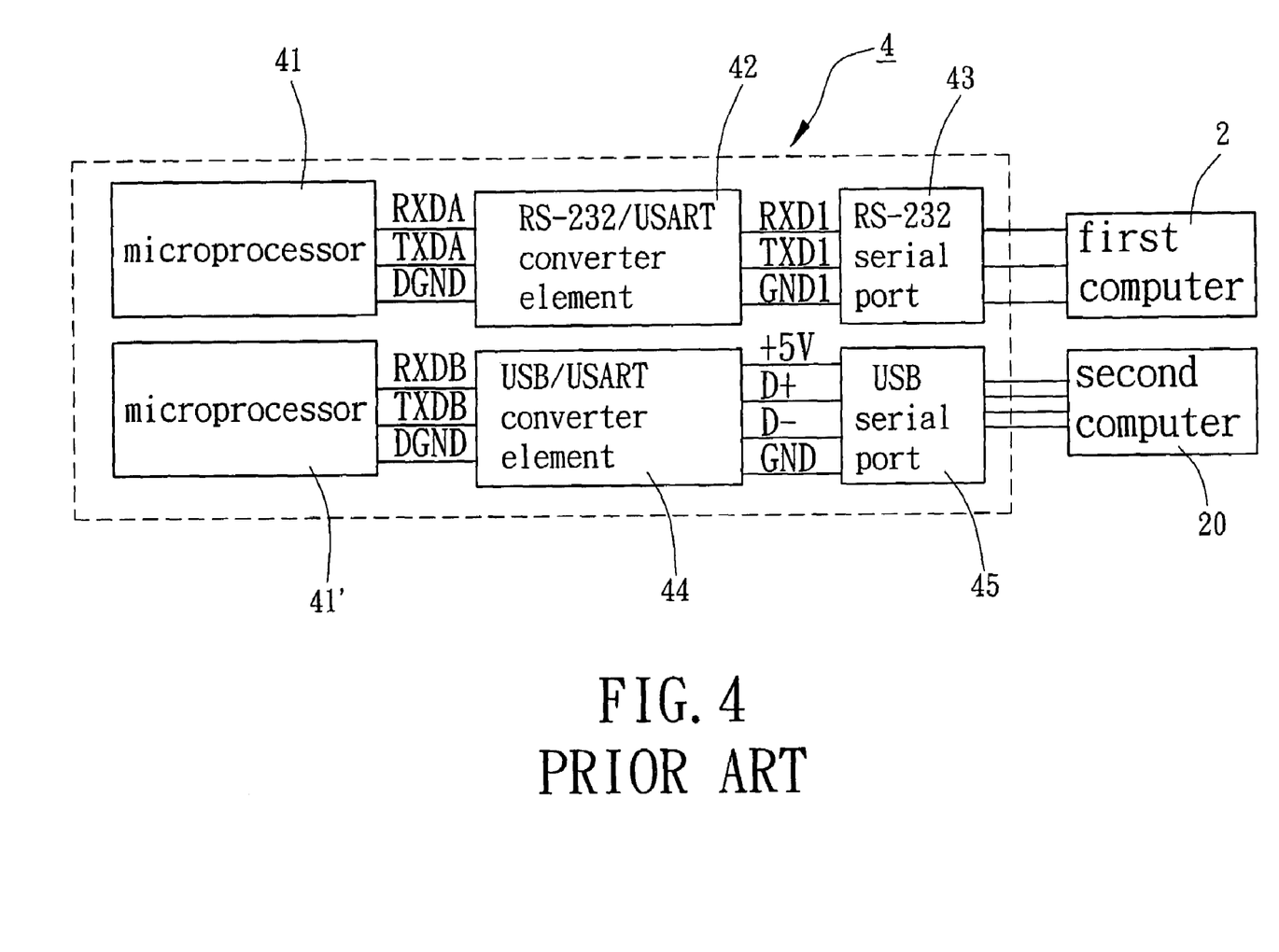
FIG. 4 is a schematic view of another conventional communication device having both of a RS-232 serial port and a USB serial port in accordance with the prior art.

To solve this problem, a computer peripheral adopting a communication device 3 having both of a RS-232 serial port and a USB serial port are shown in FIGS. 3 and 4.

FIG. 3 depicts a schematic view of dual communication interfaces of a communication device for RS-232 and USB. The communication device 3 includes a dual USARTs microprocessor 31, a RS-232/USART converter element 32, a RS-232 serial port 33, a USB/USART converter element 34 and a USB serial port 35. One USART interface of the double USART microprocessor 31 electrically connects to the RS-232/USART converter element 32. And, the RS-232/USART converter element 32 electrically connects to the RS-232 serial port 33 for providing a RS-232 protocol interface. Subsequently, the RS-232 serial port 33 communicates with a first computer 2. The other USART interface of the dual USARTs microprocessor 31 electrically connects to the USB/USART converter element 34. And, the USB/USART converter element 34 electrically connects to the USB serial port 35 for providing a USB interface. Subsequently, the USB serial port 35 communicates with a second computer 20.

FIG. 4 depicts a schematic view of other dual communication interfaces of a communication device for RS-232 and USB. The communication device 4 includes a first single USART microprocessor 41, a second single USART microprocessor 41', a RS-232/USART converter element 42, a RS-232 serial port 43, a USB/USART converter element 44 and a USB serial port 45. A USART interface of the first USART microprocessor 41 electrically connects to the RS-232/USART converter element 42. And, the RS-232/USART converter element 42 electrically connects to the RS-232 serial port 43 for providing a RS-232 protocol interface. Subsequently, the RS-232 serial port 43 communicates with a first computer 2. A USART interface of the second USART microprocessor 41' electrically connects to the USB/USART converter element 44. And, the USB/USART converter element 44 electrically connects to the USB serial port 45 for providing a USB interface. Subsequently, the USB serial port 45 communicates with a second computer 20.

However, the communication device including RS-232 and USB may increase manufacture cost even though it has an advantage of providing dual communication functions for RS-232 and USB simultaneously.

The present invention intends to provide a switching device for RS-232 serial port and USB serial port using a photo-coupler device to automatically select one receiving data pin (RXDA and RXDB lines) of the RS-232 serial port or the USB serial port for communicating data. Firstly, a microprocessor with only one USART can be used to perform automatically selecting one receiving data pin (RXD line) of both RS-232 serial port and USB serial port as a main COM port for communicating data from the microprocessor to a first computer. Secondly, the other unselected one of a transmitting data pin (TXD line) of the RS-232 serial port and the USB serial port that is regarded as a secondary COM port still also transmits data from the microprocessor to a second computer. Thereby, the switching device for RS-232 serial port and USB serial port employs the photo-coupler device to automatically select one of the RS-232 serial port or the USB serial port in such a way to mitigate and overcome the above problem.

SUMMARY OF THE INVENTION

The primary objective of this invention is to provide a switching device of a single USART microprocessor using a photo-coupler device to automatically select RS-232 serial port or USB serial port. In operation, the selected one of the RS-232 serial port or the USB serial port is regarded as a main COM port while the other unselected one of transmitting data pins (TXD lines) of the RS-232 serial port and the USB serial port communicates data from the microprocessor to another computer. Thereby, it is convenient in operation and can reduce the manufacture cost.

The switching device for RS-232 serial port and USB serial port in accordance with the present invention includes a single USART microprocessor, a photo-coupler device, a RS-232/USART converter element, a RS-232 serial port, a USB/USART converter element and a USB serial port. The single USART microprocessor has a transmitting data pin (TXD line) and a receiving data pin (RXD line). The transmitting data pin of the single USART microprocessor connects to a transmitting data pin (TXDA) of the RS-232/USART converter element and a transmitting data pin (TXDB) of the USB/USART converter element together. The receiving data pin of the single USART microprocessor connects to two anodes of two diodes, and two cathodes of the two diodes connects to a receiving data pin (RXDA) of the RS-232/USART converter element and a receiving data pin (RXDB) of the USB/USART converter element.

A separate aspect of the present invention is that a first terminal of the photo-coupler device acts as the control input and is controlled by +5V supplied from a power source of the USB serial port through a current-limiting resistor. And a second terminal of the photo-coupler device connects to the receiving data pin (RXDA) of the RS-232/USART converter element. In this aspect, the USB serial port has a high priority for communication with one of the computers.

A further separate aspect of the present invention is that a DTR pin of the RS-232 serial port controls a first terminal of the photo-coupler device. And a second terminal of the photo-coupler device connects to the receiving data pin (RXDB) of the USB/USART converter element. In this aspect, the RS-232 serial port has a high priority for communication with one of computers.

In a yet further separate aspect of the present invention, a DIP switch is used to select one of the RS-232 serial port and the USB serial port. In operation, the selected one of the RS-232 serial port and the USB serial port has a high priority for communication with one of computers.

In a yet further separate aspect of the present invention, a first terminal of the photo-coupler device acts as a control input and is controlled by control signals supplied from the USB serial port through the USB/USART converter element and the current-limiting resistor. And a second terminal of the photo-coupler device connects to the receiving data pin (RXDA) of the RS-232/USART converter element.

Thereby, the switching device selects one of the RS-232 serial port and the USB serial port regarded as a main COM port while the unselected other one of the RS-232 serial port and the USB serial port can still transmit data from the microprocessor to another computer Other objectives, advantages and novel features of the invention will become more apparent from the following detailed description and the accompanying drawings.

BRIEF DESCRIPTION OF THE DRAWINGS

The present invention will now be described in detail with reference to the accompanying drawings wherein.

DETAILED DESCRIPTION OF THE INVENTION

Figure 5:
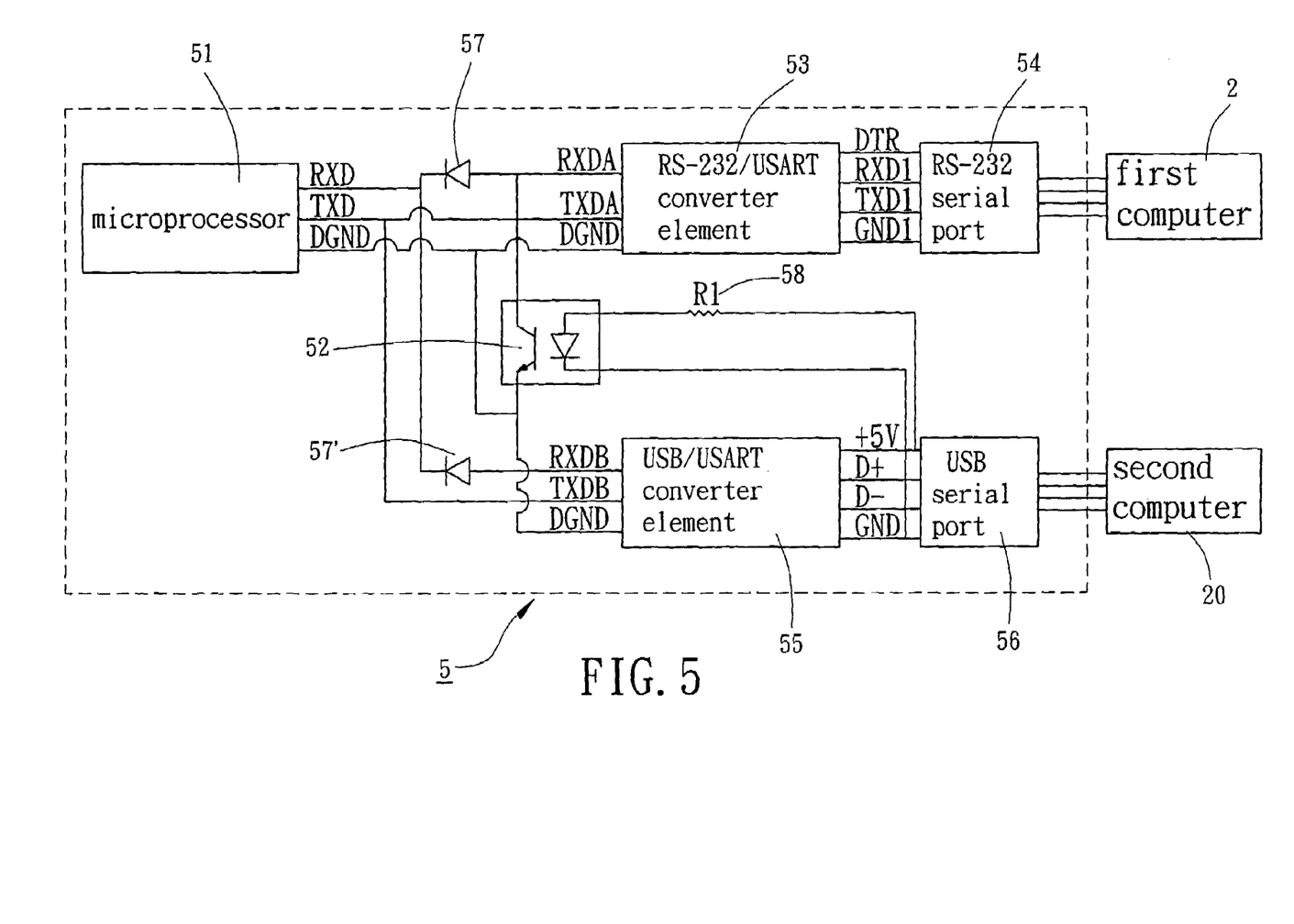
FIG. 5 is a schematic view of a switching device for RS-232 serial port and USB serial port in accordance with a first embodiment of the present invention.

Referring to FIG. 5, it depicts a schematic view of a switching device for RS-232 serial port and USB serial port in accordance with a first embodiment of the present invention. In this embodiment, the switching device 5 includes a single USART microprocessor 51, a photo-coupler device 52, a RS-232/USART converter element 53, a RS-232 serial port 54, a USB/USART converter element 55, a USB serial port 56, a first diode 57, a second diode 57' and a current-limiting resistor 58.

Still referring to FIG. 5, the single USART microprocessor 51 has a transmitting data pin (TXD) connecting to a transmitting data pin (TXDA) of the RS-232/USART converter element 53 and a transmitting data pin (TXDB) of the USB/USART converter element 55. Correspondingly, the single USART microprocessor 51 has a receiving data pin (RXD) connecting to two cathodes of the first diode 57 and the second diode 57'. Two anodes of the first diode 57 and the second diode 57' connect with a receiving data pin (RXDA) of the RS-232/USART converter element 53 and a receiving data pin (RXDB) of the USB/USART converter element 55. A first terminal of the photo-coupler device 52 acts as the control input and is controlled by +5V supplied from a power source of the USB serial port 56 through the current-limiting resistor 58. And a second terminal of the photo-coupler device 52 connects to the receiving data pin (RXDA) of the RS-232/USART converter element 53.

Further, the RS-232 serial port 54 connects to the RS-232/USART converter element 53 while the USB serial port 56 connects to the USB/USART converter element 55

Still referring to FIG. 5, in operation, the RS-232 serial port 54 continuously communicates with the single USART microprocessor 51 through the RS-232/USART converter element 53 for a first computer 2. Once a second computer 20 hooks up the USB serial port 56, the first terminal of the photo-coupler device 52 is actuated and the second terminal conducts to cause the receiving data pin (RXDA) of the RS-232/USART converter element 53 is disabled. This permits changing the single USART microprocessor 51 to communicate data to the second computer 20 through the USB serial port 56. Until the second computer 20 is removed from the USB serial port 56, the second terminal of the photo-coupler device 52 is opened so that the receiving data pin (RXDA) of the RS-232/USART converter element 53 is enabled again. Namely, the single USART microprocessor 51 returns to communicate with the first computer 2 through the RS-232 serial port 54. The switching device 5 uses the photo-coupler device 52 for selecting one of the RS-232 serial port 54 and the USB serial port 56. In this embodiment, the USB serial port 56 has the high priority for communication with a computer.

Figure 6:
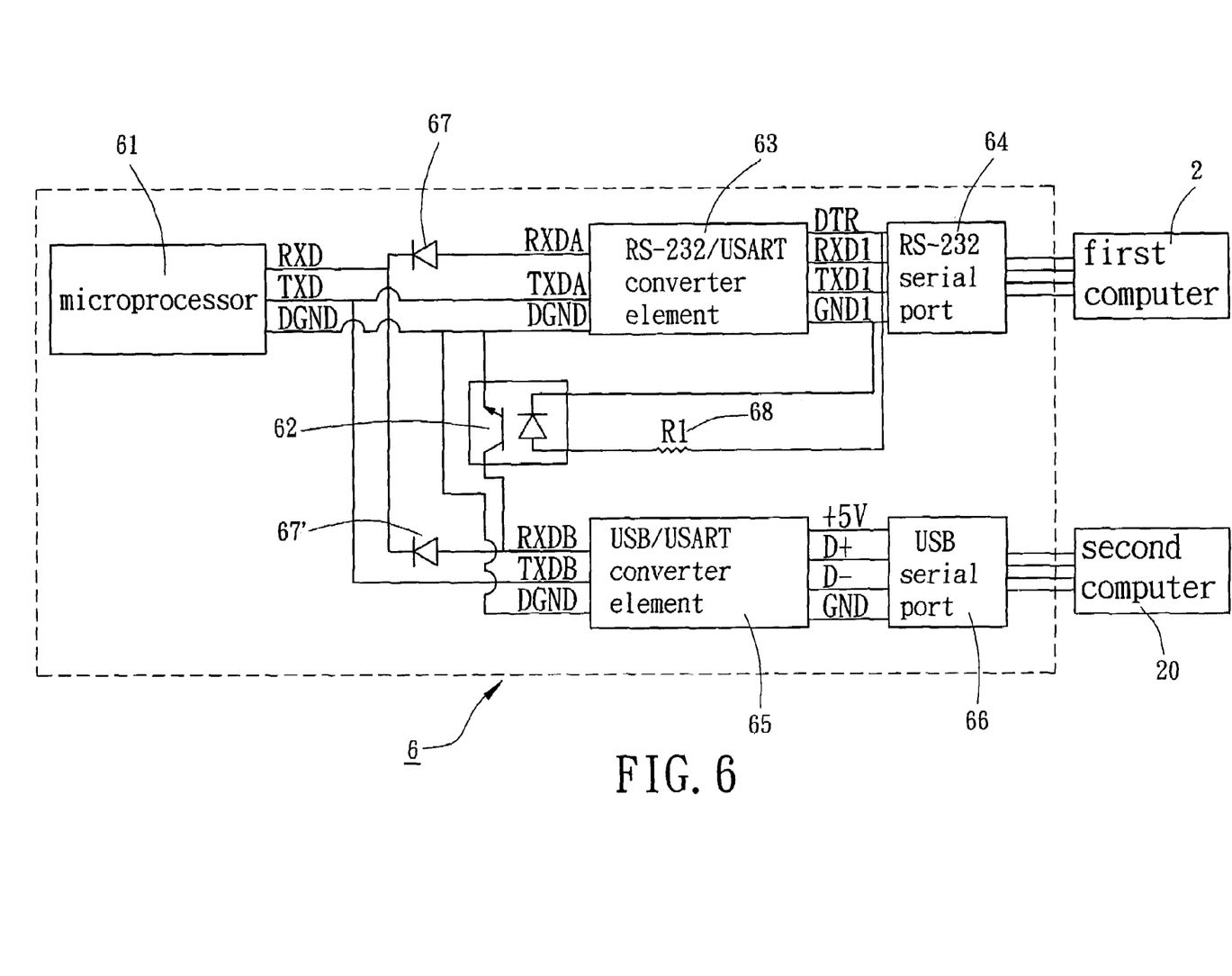
FIG. 6 is a schematic view of a switching device for RS-232 serial port and USB serial port in accordance with a second embodiment of the present invention.

Turning now to FIG. 6, it depicts a schematic view of a switching device for RS-232 serial port and USB serial port in accordance with a second embodiment of the present invention. In this embodiment, the switching device 6 includes a single USART microprocessor 61, a photo-coupler device 62, a RS-232/USART converter element 63, a RS-232 serial port 64, a USB/USART converter element 65, a USB serial port 66, a first diode 67, a second diode 67' and a current-limiting resistor 68.

Still referring to FIG. 6, the single USART microprocessor 61 has a transmitting data pin (TXD) connecting to a transmitting data pin (TXDA) of the RS-232/USART converter element 63 and a transmitting data pin (TXDB) of the USB/USART converter element 65. Correspondingly, the single USART microprocessor 51 has a receiving data pin (RXD) connecting to two cathodes of the first diode 67 and the second diode 67'. Two anodes of the first diode 67 and the second diode 67' connect with a receiving data pin (RXDA) of the RS-232/USART converter element 63 and a receiving data pin (RXDB) of the USB/USART converter element 65. A DTR pin of the RS-232 serial port 64 controls a first terminal of the photo-coupler device 62. And a second terminal of the photo-coupler device 62 connects to the receiving data pin (RXDB) of the USB/USART converter element 65.

Further, the RS-232 serial port 64 connects to the RS-232/USART converter element 63 while the USB serial port 66 connects to the USB/USART converter element 65.

Still referring to FIG. 6, in operation, the USB serial port 66 continuously communicates with the single USART microprocessor 61 through the USB/USART converter element 65 for a second computer 20. Once a first computer 2 hooks up the RS-232 serial port 64, the first terminal of the photo-coupler device 62 is actuated and the second terminal is conducted that the receiving data pin (RXDA) of the USB/USART converter element 63 is disabled. This permits changing the single USART microprocessor 61 to communicate data to the first computer 2 through the RS-232 serial port 64. Until the first computer 2 is removed from the RS-232 serial port 64, the second terminal photo-coupler device 62 is opened that the receiving data pin (RXDA) of the USB/USART converter element 63 is enable again. Namely, the single USART microprocessor 51 returns to communicate with the second computer 20 through the USB serial port 66. The switching device 6 uses the photo-coupler device 62 for selecting one of the RS-232 serial port 64 and the USB serial port 66. In this embodiment, the RS-232 serial port 64 has the high priority for communication with a computer.

Figure 7:
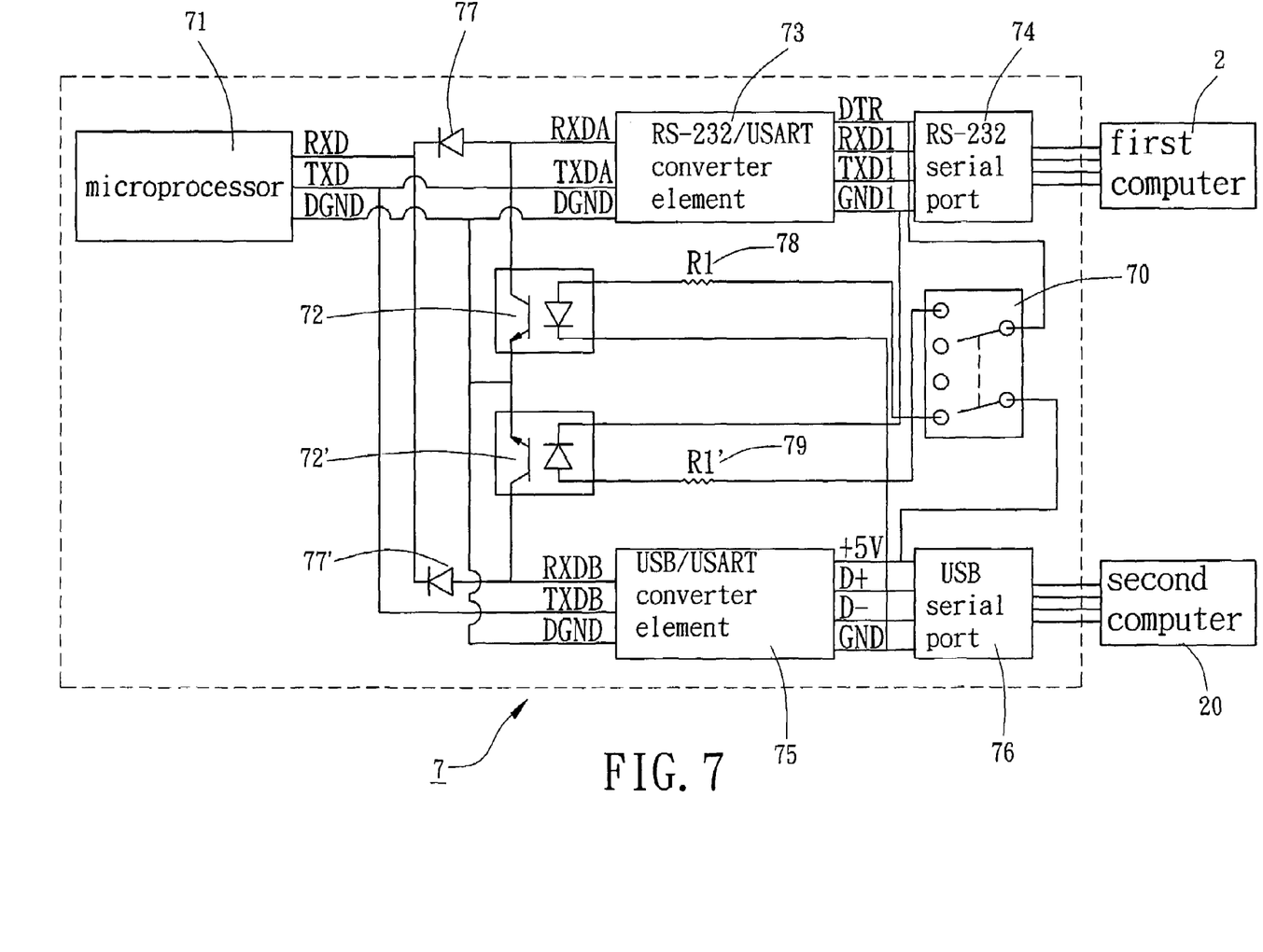
FIG. 7 is a schematic view of a switching device for RS-232 serial port and USB serial port in accordance with a third embodiment of the present invention.

Referring to FIG. 7, it depicts a schematic view of a switching device for RS-232 serial port and USB serial port in accordance with a third embodiment of the present invention. In this embodiment, the switching device 7 includes a single USART microprocessor 71, a first photo-coupler device 72, a second photo-coupler device 72', a RS-232/USART converter element 73, a RS-232 serial port 74, a USB/USART converter element 75, a USB serial port 76, a first diode 77, a second diode 77', a first current-limiting resistor 78, a second current-limiting resistor 79 and a DIP switch 70.

Still referring to FIG. 7, in this embodiment, the DIP switch 70 is used to select one of the RS-232 serial port 74 and the USB serial port 76 in manual operation. In operation, the selected one of the RS-232 serial port 74 and the USB serial port 76 has the high priority for communication with one of computers 2 and 20.

Figure 8:
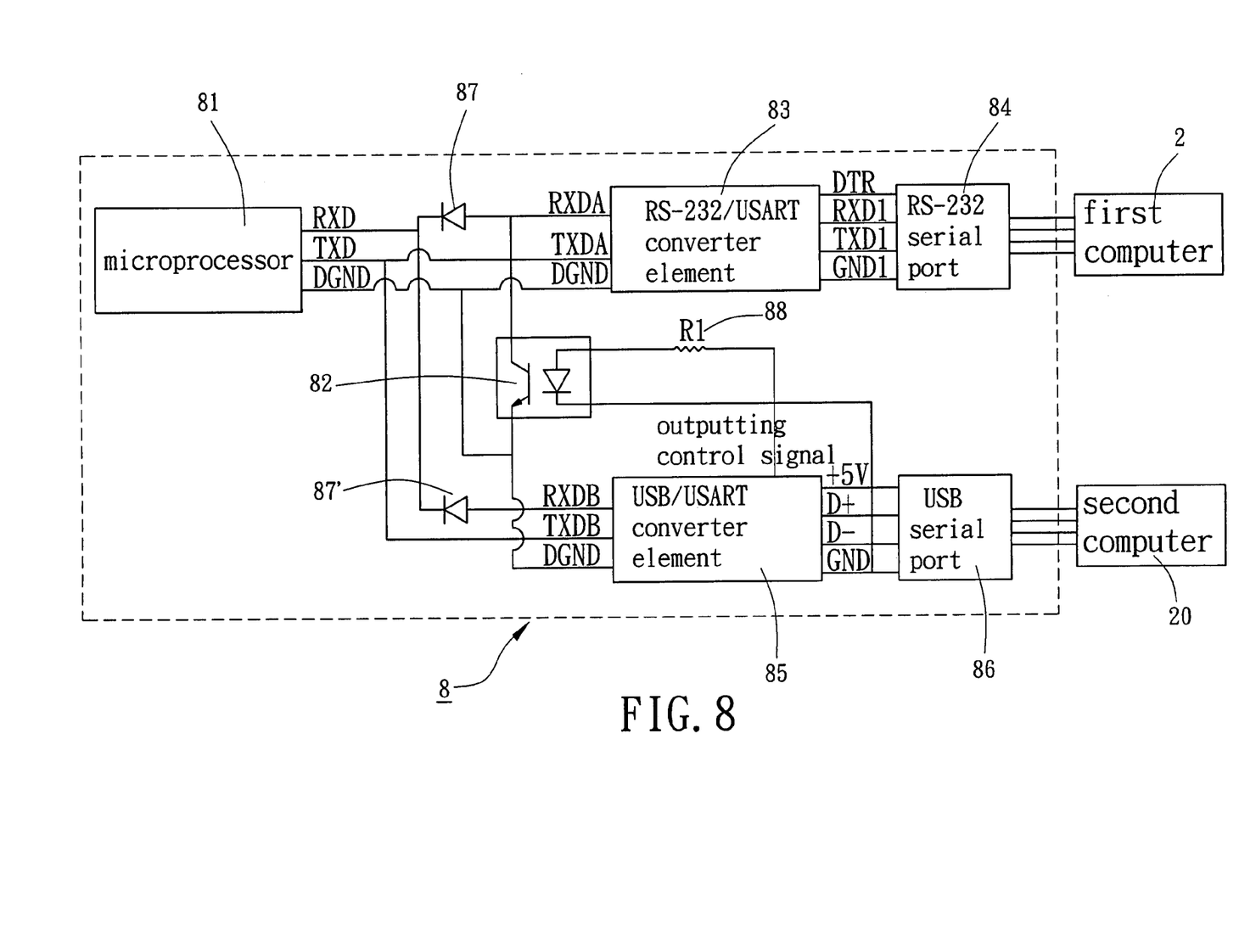
FIG. 8 is a schematic view of a switching device for RS-232 serial port and USB serial port in accordance with a fourth embodiment of the present invention.

Referring to FIG. 8, it depicts a schematic view of a switching device for RS-232 serial port and USB serial port in accordance with a fourth embodiment of the present invention. In this embodiment, the switching device 8 includes a single USART microprocessor 81, a photo-coupler device 82, a RS-232/USART converter element 83, a RS-232 serial port 84, a USB/USART converter element 85, a USB serial port 86, a first diode 87, a second diode 87' and a current-limiting resistor 88.

Still referring to FIG. 8, the single USART microprocessor 81 has a transmitting data pin (TXD) connecting to a transmitting data pin (TXDA) of the RS-232/USART converter element 83 and a transmitting data pin (TXDB) of the USB/USART converter element 85. Correspondingly, the single USART microprocessor 81 has a receiving data pin (RXD) connecting to two cathodes of the first diode 87 and the second diode 87'. Two anodes of the first diode 87 and the second diode 87' connect with a receiving data pin (RXDA) of the RS-232/USART converter element 83 and a receiving data pin (RXDB) of the USB/USART converter element 85. A first terminal of the photo-coupler device 82 acts as the control input and is controlled by control signals supplied from the USB serial port 86 through the USB/USART converter element 85 and the current-limiting resistor 88. And a second terminal of the photo-coupler device 82 connects to the receiving data pin (RXDA) of the RS-232/USART converter element 83.

Further, the RS-232 serial port 84 connects to the RS-232/USART converter element 83 while the USB serial port 86 connects to the USB/USART converter element 85.

Still referring to FIG. 8, in operation, the RS-232 serial port 84 continuously communicates with the single USART microprocessor 81 through the RS-232/USART converter element 83 for a first computer 2. Second computer 20 hooks up the USB serial port 86 for communication. When the USB/USART converter element 85 received a complete command from the second computer 20, a control signal from the USB/USART converter element 85 actuates the first terminal of the photo-coupler device 82 and then the second terminal is closed. Accordingly, the receiving data pin (RXDA) of the RS-232/USART converter element 83 is disabled. This permits changing the single USART microprocessor 81 to communicating data to the second computer 20 through the USB serial port 86. Until another complete command from the second computer 20 is sent to the single USART microprocessor 81, the first terminal of the photo-coupler device 82 is cut off. Accordingly, the second terminal photo-coupler device 82 is opened so that the receiving data pin (RXDA) of the RS-232/USART converter element 83 is enabled again. Namely, the single USART microprocessor 81 returns to communicate with the first computer 2 through the RS-232 serial port 84. The switching device 8 uses the photo-coupler device 82 for selecting one of the RS-232 serial port 84 and the USB serial port 86.

Referring back to FIG. 3, the conventional communication device 3 must employ a dual USARTs microprocessor 31 that will increase manufacture cost. Similarly, referring back to FIG. 4, the conventional communication device 4 must employ two single USART microprocessors 41 and 41' that may also increase manufacture cost.

Referring again to the FIG. 5 to 8, each of the switching devices employs only a single USART microprocessor and a photo-coupler device that may reduce manufacture cost. Also, each of the switching devices 5 to 8 provides with the RS-232 serial port and the USB serial port at the same time. It is an advantage of using the photo-coupler device that the selected one of the RS-232 serial port and the USB serial port is regarded as a main COM port while the unselected other one of the RS-232 serial port and the USB serial port transmitting data from the microprocessor to another computer.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A switching device automatically selecting a main communication port from either of Recommended Protocol 232 (RS-232) or Universal Serial Bus (USB) via switching, comprising:
   a microprocessor having a Universal Synchronous Asynchronous Receiver Transmitter (USART);
   a first diode having an anode and a cathode;
   an RS-232/USART converter element connecting to the microprocessor through the first diode wherein the anode of the first diode electrically connects to the RS-232/USART converter element, and the cathode of the first diode electrically connects to the microprocessor;
   an RS-232 serial port connecting to the RS-232/USART converter element;
   a second diode having an anode and a cathode;
   a USB/USART converter element connecting to the microprocessor through the second diode, wherein the anode of the second diode electrically connects to the USB/USART converter element, and the cathode of the second diode electrically connects to the microprocessor as well as the cathode of the first diode;
   a USB serial port connecting to the USB/USART converter element;
   at least one photo-coupler device including a first terminal and a second terminal, the first terminal of the photo-coupler device being a control input, and the second terminal of the photo-coupler device including a controllable switch to disable the USB/USART converter element or RS-232/USART converter element from transmitting data to the microprocessor; and
   a current-limiting resistor including a first end and a second end, the first end of the current-limiting resistor connecting to the first terminal of the photo-coupler device with the second end of the current-limiting resistor selectively connecting to a control signal, whereby one of the RS-232 serial port and the USB serial port has a high priority for communication with the microprocessor, and
   wherein said disabled one of said RS-232/USART converter element or USB/USART converter element can still receive data from the microprocessor even though it is disabled from transmitting data to the microprocessor.

2. The switching device as defined in claim 1, wherein a transmitting data pin of the USART of the microprocessor connects directly to a transmitting data pin of the RS-232/USART converter element and a transmitting data pin of the USB/USART converter element.

3. The switching device as defined in claim 1, wherein the USART of the microprocessor has a receiving data pin connecting to the two cathodes of the first diode and the second diode, and the anodes of the first diode and the second diode respectively connect with a receiving data pin of the RS-232/USART converter element and a receiving data pin of the USB/USART converter element.

4. The switching device as defined in claim 1, further comprising another said second terminal, wherein the first terminal of the photo-coupler device inputs and is controlled by +5V supplied from a power source of the USB serial port, a first said second terminal of the photo-coupler device connects to a receiving data pin of the RS-232/USART converter element, and said another said second terminal of the photo-coupler device connects to a ground pin of the RS-232/USART converter element, and the USB serial port has high priority for communication with the microprocessor.

5. The switching device as defined in claim 1, further comprising another said second terminal, wherein a DTR pin of the RS-232 serial port controls the first terminal of the photo-coupler device and a first said second terminal of the photo-coupler device connects to a receiving data pin of the USB/USART converter element, and said another said second terminal of the photo-coupler device connects to a ground pin of the USB/USART converter element, and the RS-232 serial port has high priority for communication with the microprocessor.

6. The switching device as defined in claim 1, further comprising a DIP switch used to select one of the RS-232 serial port and the USB serial port for high priority.

7. The switching device as defined in claim 1, further comprising another said second terminal, wherein the first terminal of the photo-coupler device is controlled by control signals supplied from the USB serial port through the USB/USART converter element, and a first said second terminal of the photo-coupler device connects to a receiving data pin of the RS-232/USART converter element, said another said second terminal of the photo-coupler device connects to a ground pin of the USB/USART converter element, and the USB serial port has high priority for communication with the microprocessor.

8. The switching device as defined in claim 6, wherein the photo-coupler device includes two photo-couplers, two of the second terminals of the photo-couplers connect to two ground pins of the RS-232/USART converter element and the USB/USART converter element, another one of the second terminals connects to a receiving data pin of the RS-232/USART converter element, and another one of the second terminals connects to a receiving data pin of the USB/USART converter element, whereby one of the USB serial port and the RS-232 serial port has high priority for communication with the microprocessor by means of the DIP switch.

9. The switching device as claimed in claim 1, wherein the ground pins of the RS-232/USART converter element, the USB/USART converter element and the USART of the microprocessor are connected together.

* * * * *

UNITED STATES PATENT AND TRADEMARK OFFICE
CERTIFICATE OF CORRECTION

| | | |
|---|---|---|
| PATENT NO. | : 7,398,336 B2 | Page 1 of 1 |
| APPLICATION NO. | : 11/016744 | |
| DATED | : July 8, 2008 | |
| INVENTOR(S) | : Ya-Tsung Feng et al. | |

It is certified that error appears in the above-identified patent and that said Letters Patent is hereby corrected as shown below:

Title Page, item [73] Assignee: should read as follows: --Ablerex Electronics Co., Ltd.--

Signed and Sealed this

Fifth Day of January, 2010

David J. Kappos
*Director of the United States Patent and Trademark Office*